Oct. 3, 1939.  T. H. OPPENHEIM ET AL  2,175,088
COMBINED SIDE DELIVERY RAKE AND TEDDER
Filed Aug. 8, 1936  4 Sheets-Sheet 1
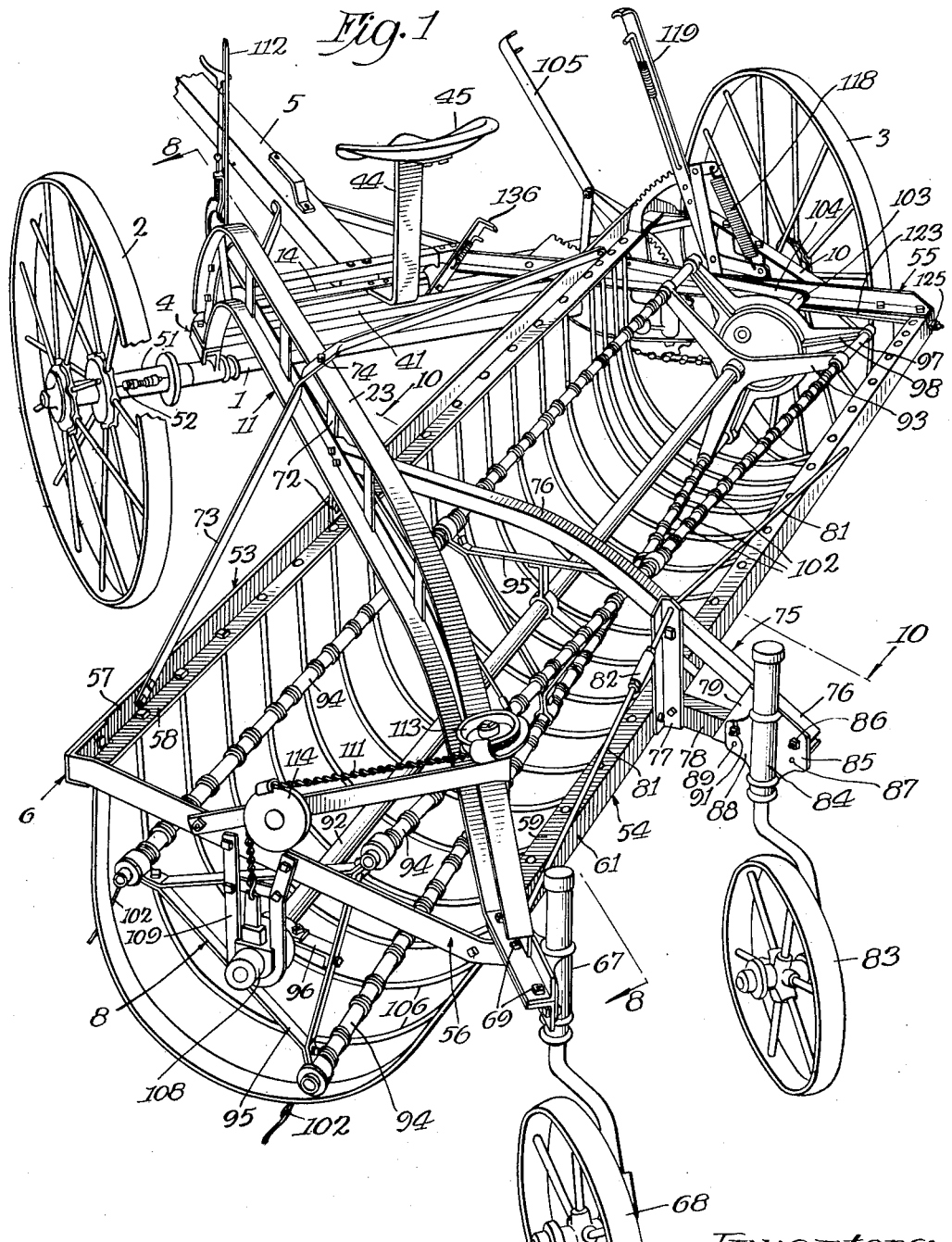
Inventors:
Theodore H. Oppenheim
Henry Synck
By Gilson, Maur
Attys.

Oct. 3, 1939. T. H. OPPENHEIM ET AL 2,175,088
COMBINED SIDE DELIVERY RAKE AND TEDDER
Filed Aug. 8, 1936 4 Sheets-Sheet 2
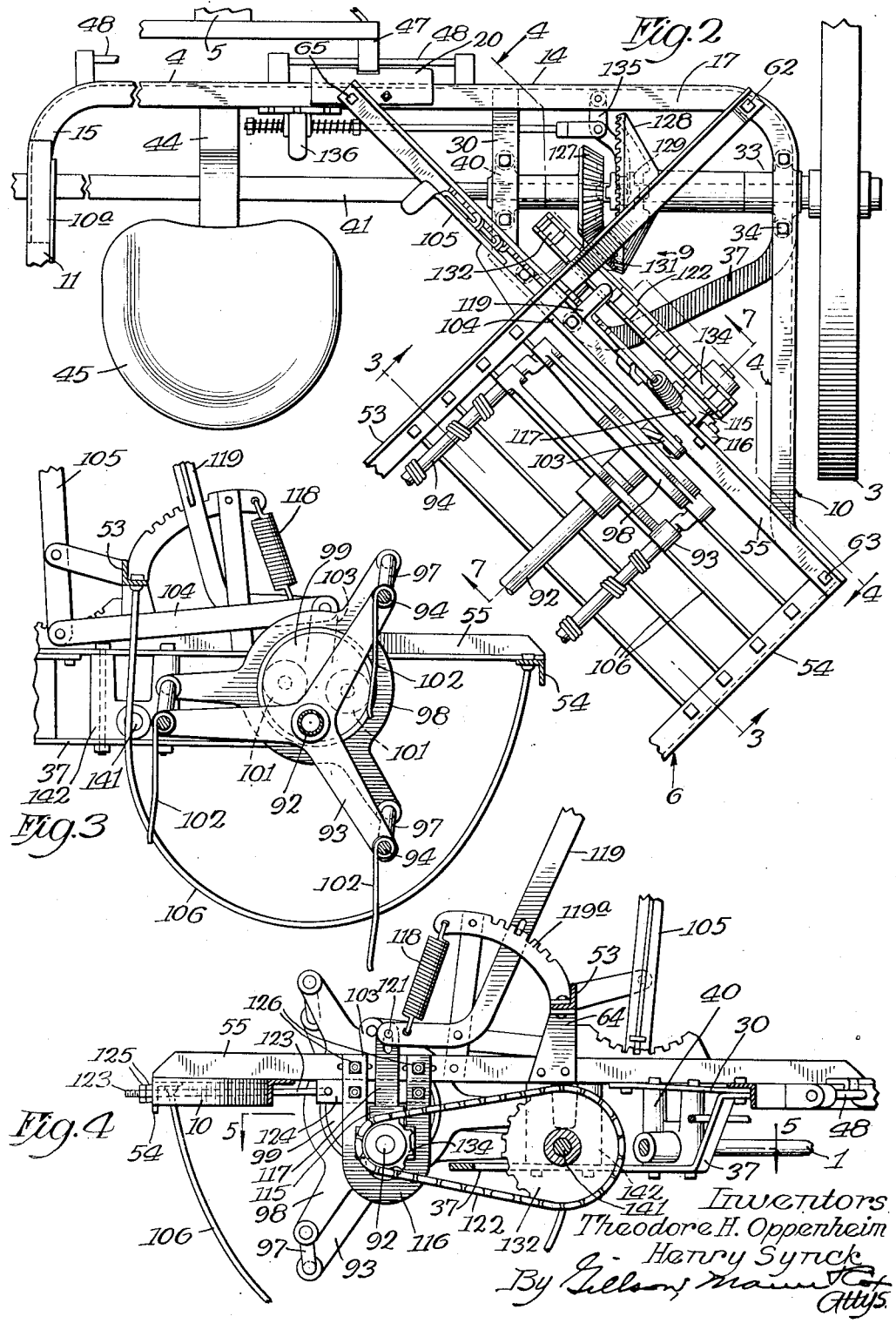
Inventors
Theodore H. Oppenheim
Henry Synck
By Gilson Maur
Attys.

Oct. 3, 1939.  T. H. OPPENHEIM ET AL  2,175,088
COMBINED SIDE DELIVERY RAKE AND TEDDER
Filed Aug. 8, 1936   4 Sheets-Sheet 3
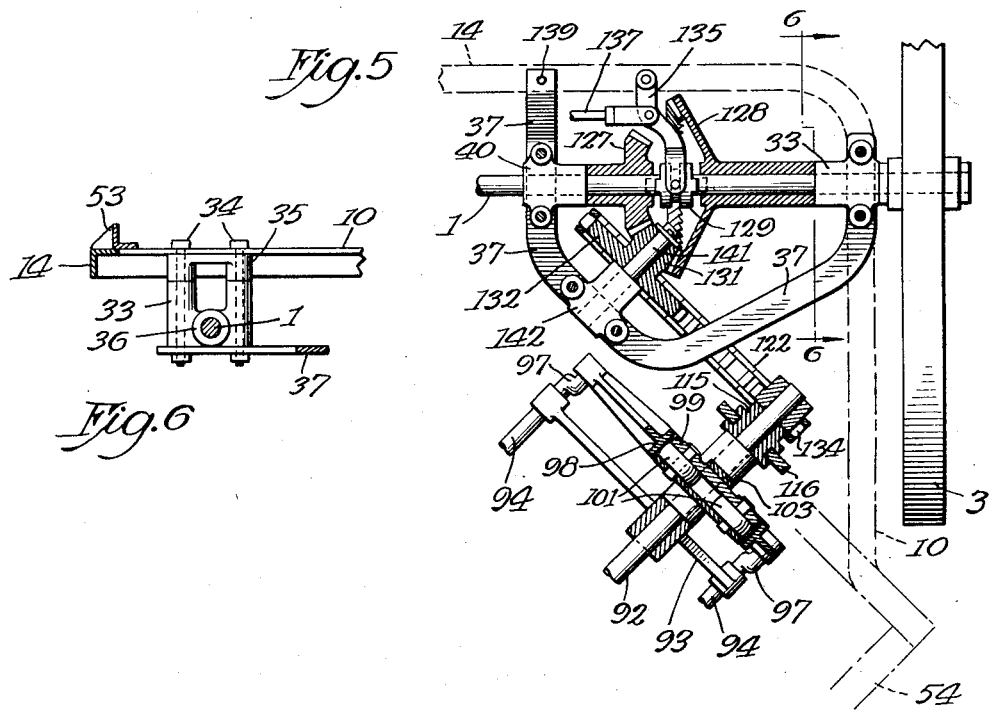
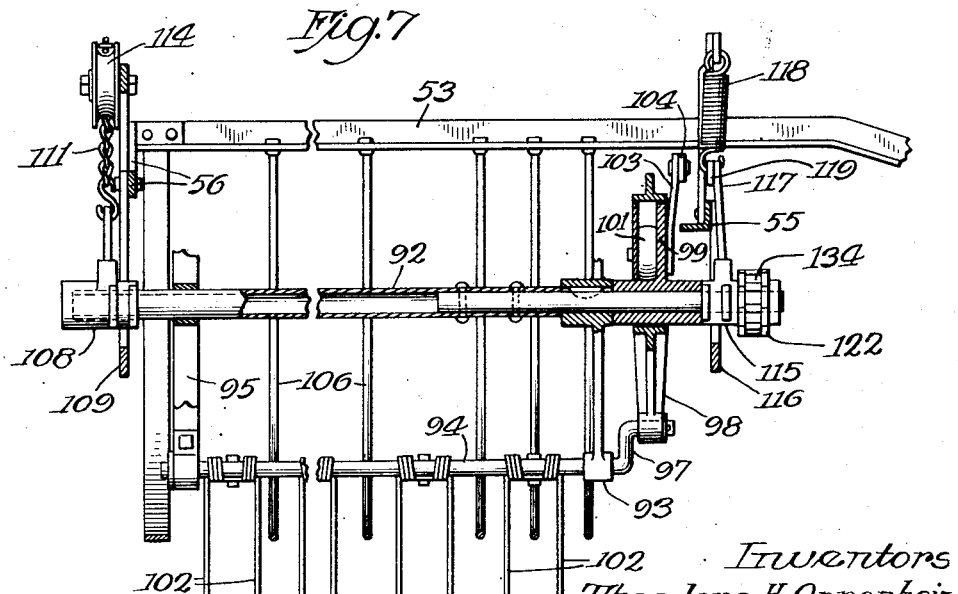

Oct. 3, 1939.　　　T. H. OPPENHEIM ET AL　　　2,175,088
COMBINED SIDE DELIVERY RAKE AND TEDDER
Filed Aug. 8, 1936　　　4 Sheets-Sheet 4
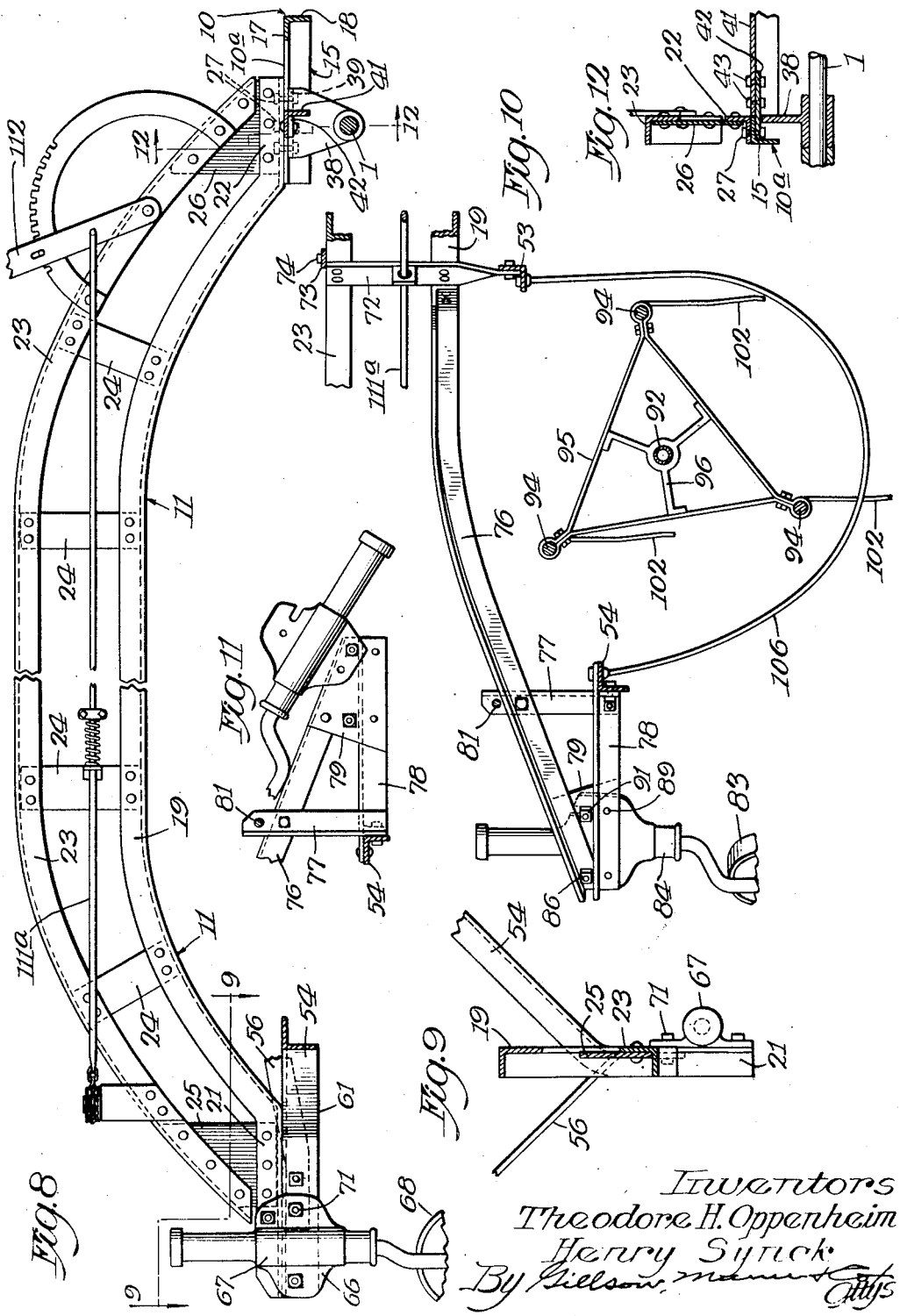
Inventors
Theodore H. Oppenheim
Henry Synck Patented Oct. 3, 1939

2,175,088

UNITED STATES PATENT OFFICE 2,175,088

COMBINED SIDE DELIVERY RAKE AND TEDDER

Theodore H. Oppenheim and Henry Synck, Coldwater, Ohio, assignors to New Idea, Inc., a corporation of Ohio Application August 8, 1936, Serial No. 94,952

16 Claims. (Cl. 56—366)

This invention relates to farm implements and more particularly to combined side delivery rakes and tedders.

One of the objects of the invention is the provision of a new and improved combined side delivery rake and tedder having novel means for stiffening the frame and for preventing vibration thereof during use under any and all conditions.

Another object of the invention is the provision of new and improved reinforced or rigid frames, together with novel means for mounting the reel thereon so that it will have more or less freedom of movement.

A further object of the invention is the provision of a new and improved combined rake and tedder having the parts so constructed and arranged that the rake drum or reel supporting frame will be rigid and the draft be directly conveyed to the frame independently of the main supporting axle.

Another object of the invention is the provision of a new and improved side delivery rake having optionally a second supporting caster which has novel means whereby the same may be readily moved from operative to inoperative position and vice versa.

A still further object of the invention is the provision of a new and improved combined tedder and side delivery rake having novel means associated with the auxiliary supporting caster for stiffening the reel supporting frame and adding rigidity to the entire structure.

A further object of the invention is the provision of new and improved means for stiffening the reel supporting frame and so constructing and mounting the reel that it will have a certain flexibility of movement during operation.

A further object of the invention is the provision of a new and improved rake that is simple in construction, comparatively inexpensive to manufacture, easily assembled, efficient in operation and that is strong, sturdy and not likely to break or become out-of-repair.

A further object of the invention is the provision of a new and uniform rake that has unusual vertical clearance below the arch and in front of the reel for handling heavy hay without blocking in front of the arch member.

Other and further objects and advantages of the invention will appear from the following description taken in connection with the accompanying drawings, in which:

Fig. 1 is a perspective view of a combined side delivery rake and tedder;

Fig. 2 is a plan view of a portion of the device with parts broken away;

Fig. 3 is a section on the line 3—3 of Fig. 2;

Fig. 4 is a section on the broken line 4—4 of Fig. 2;

Fig. 5 is a section on the line 5—5 of Fig. 4;

Fig. 6 is a section on the line 6—6 of Fig. 5;

Fig. 7 is a section on the line 7—7 of Fig. 2;

Fig. 8 is a section on the line 8—8 of Fig. 1;

Fig. 9 is a section on the broken line 9—9 of Fig. 8;

Fig. 10 is a section on the line 10—10 of Fig. 1;

Fig. 11 is an elevation of the attaching means for the supplemental caster wheel showing the same in inoperative position with parts in section and parts broken away; and Fig. 12 is a sectional view on the line 12—12 of Fig. 8.

Referring to the drawings, the reference character 1 designates the main axle on which the ground wheels 2 and 3 are mounted.

A main frame 4 (see Fig. 1) is rigidly secured to the axle and extends forwardly therefrom and the tongue 5 of the implement is attached to the forwardly projecting portion of the main frame. A supplemental or reel supporting frame 6 is carried by the main frame and supports the reel and associated mechanism designated generally by the reference character 8. The driving mechanism for the reel is shown at 9 (see Fig. 2).

The main frame 4 for the combined rake and tedder mechanism has its forward portion supported on the axle 1 and comprises the side frame members 10 and 10ª (see Figs. 1 and 2). The side frame member 10 has its forward portion extended forwardly of the axle and curved laterally to form what may be termed the draft yoke 14 (see Fig. 2) which extends forwardly of the axle 1. The end of the curved portion is bent rearwardly, as at 15, and passes rearwardly across the axle 1, as more clearly shown in Figs. 8 and 12 of the drawings. The other longitudinal side frame or truss member 11 is rigidly attached to the end 15 of the side bar 10ª, as shown in Figs. 8 and 12, and extends rearwardly for supporting the outer end of the supplemental or reel supporting frame 6, as will presently appear. The side bar 10 may be of any suitable construction. That shown is formed from an angle bar having a horizontal flange 17 and a downwardly extending flange 18 (see Fig. 8).

It is common practice in the construction of side delivery rakes to employ a single angle bar for the portion of the main frame that supports the outer or rear end of the reel frame. This form of construction is objectionable for, because of its length and cross-sectional dimension, it is subject to vertical vibration when the implement is used, especially on rough ground. Under certain conditions, the vibrations of this bar or side frame member will build up to such an extent as to cause the teeth to dig into the ground with the result that some or all of the teeth may become permanently distorted. The present invention seeks to remedy this difficulty by properly reinforcing or trussing this bar or side frame member whereby a rigid main frame is provided. This frame member shown at 11 in Figs. 1 and 8 is preferably arched to provide clearance and to add to its rigidity in a vertical plane. With a rigid main frame, it is necessary that a certain amount of flexibility be provided for the reel as otherwise the reel, when the teeth strike a hummock or other projection, tends to lift the entire frame instead of flexing the same. This is accomplished by the provision of suitable reel construction and supporting means, as will hereinafter be described.

The member 11 comprises a lower bar 19 (see Fig. 8) which is bent to the form of an arch having its end portion 21 and 22 horizontal and an upper arch-shaped angle bar 23 spaced vertically from the lower bar 19. These bars are preferably, though not necessarily, angle bars having vertical flanges directed toward each other and connected by a plurality of suitably arranged truss or spacing members 24. The corresponding ends of the lower and upper bars 19 and 23 are connected together by the gusset plates 25 and 26, as clearly shown in Fig. 8 of the drawing. The forward end of the frame member 11 is rigidly connected to the side frame member 10ª by bolts or rivets 27 which extend through the overlapping flanges of said frame members, as shown more clearly in Fig. 8.

Suitable means are provided for supporting the forward end of the main frame. In the form of construction shown, which is by way of example only, the forward end of the frame 4 is supported by the axle. The side frame 10 is secured to the axle 1 by means of the bearing bracket 33 (see Fig. 6) which is attached to said frame by a suitable fastening means, such as the bolts 34. The bearing bracket 33 for convenience of assembling the gear support and mechanism is made in two parts; the upper part 35 is in the nature of a spacer. The bearing bracket 33 carries a bearing 36 for the axle 1. Attached to the bracket 33 by the bolts 34 is the gear supporting bar 37, as will presently appear.

An intermediate bearing 40 for the axle is also provided. This bearing is secured between the gear supporting bar 37 and a bearing supporting bar 30 which is rigidly connected to the main and supplemental or reel supporting frame. The side frame member 11 is secured to the axle by means of a bearing bracket 38 (see Figs. 8 and 12,) the lower portion of which forms a bearing for the axle 1, as clearly shown in Fig. 8 and 12 of the drawings. The bearing bracket 38 is provided at its upper end with an outwardly extending apertured flange 39 and the side frame member 10ª has its horizontal flange 17 resting on and rigidly secured to the flange 39. The rear end of the side frame or trussed member 11 is supported by one or more caster wheels, as will presently appear.

A suitable brace and seat supporting bar 41 extends across the draft yoke portion of the main frame and is secured to the axle bearing bracket 38 by means of a plate 42 (see Fig. 12) that is rigidly secured to one end of the seat supporting bar 41, as by means of the rivets 43. The upper portion of the bracket 38 is recessed for receiving the outer end of the plate 42 and one of the bolts 27 engages this plate for holding the parts in assembled relation. The opposite end of the seat supporting bar 41 is secured to a brace member or front end bar of the supplemental frame, as will presently appear. A seat spring 44 has its lower end bent to extend forwardly to form a supporting bent portion. The bent end is rigidly connected to the yoke member 14, as clearly shown in Fig. 1 of the drawings. The usual seat 45 is mounted on the upper end of the spring, as is usual in such constructions.

The tongue 5 of the implement is attached to the draft yoke 14 in any suitable manner. As indicated on the drawing, the tongue is provided with draft lugs or hounds 47 at each side thereof, as shown in Fig. 2, which are adapted to slidably engage bars 48 supported on the yoke 14. Suitable means, such as the spring plate 20 attached to the yoke 14 (see Fig. 2) and having notches in its free side for receiving one of the draft hounds 47 is provided for holding said lugs in adjusted position along the bars 48. In adjusting the hound 47, the free end of the plate 20 is sprung upwardly and the hound moved to the desired notch and the plate released. By means of this arrangement, the tongue may be shifted relative to the implement when it is desired to operate the same under different conditions, as when operating the implement as a rake or tedder, or for raking beans or for raking and for half turning and the like.

When the implement is used for raking and for half turning a windrow, the tongue 5 is shifted, as described above and the wheel 2 is also shifted inwardly along the axle 1 so that the same will not travel over the hay. This is accomplished by providing a split collar 51 (see Fig. 1) which may be removed from the axle at the inner side of the wheel and placed on the axle at the outer side of the wheel by moving the wheel inwardly. This sleeve is a split collar hinged at one side and having a spring-pressed pin 52 at its opposite side for engaging overlapping apertured lugs on the two sections.

Since the tongue and wheel adjustments referred to above constitute no part of the present invention, it is not thought necessary to further illustrate or described the same.

The supplemental or reel supporting frame will now be described. This frame comprises a front side bar 53, a rear side bar 54, a front end bar 55 and a rear end bar 56. The front and rear side bars and the front end bar are preferably, though not necessarily, angle bars. The front side bar 53 has one flange 57 extending upwardly and its horizontal flange 58 extending laterally inwardly. The rear side bar 54 has an inwardly extending horizontal flange 59 and a downwardly extending flange 61. The front side bar 53 is arched at its forward end and the end thereof is rigidly attached to the draft yoke 14 of the main frame 4, as by means of the bolts 62. The rear side bar 54 underlies the rear end of the end bar 55 and extends beneath the horizontal flange of the side frame member 10 of the main frame, (see Fig. 4). The rear end of the side bar 10 is bent to parallel the front end bar 55 and engages beneath the same. The bars 54, 55 and 10 are rigidly connected in any suitable manner, as by means of the bolts 63. The end bar 55 is rigidly connected to the front side bar 53 by a suitable bracket 64, as shown more clearly in Fig. 4 of the drawings. The front end of the bar 55 is prolonged beyond the bar 53 and is rigidly connected to the draft yoke 14 as at 65. The bar 55 extending across the curved portion at the front of the main frame 4 adds stiffness to said frame, and at the same time, connects the main and supplemental frames together. The rear end bar 56 has its forward end bent inwardly and rigidly attached to the vertical flange 57 of the front side bar 53.

The rear ends of the bars 56, 54 and the truss member 11 are connected together in the following manner. The rear bar 54 at its outer end is bent rearwardly and has its downwardly extending flange 61 rigidly connected to the wings 66 of a bearing 67 for a caster 68 (see Figs. 1 and 8). The lower arch bar of the truss member 11 has its rear end bent horizontally and the horizontal flange of said bar rests on the horizontal flange 59 of the rear side bar 54 and is rigidly secured thereto as by the bolts 69. The rear end member 56 is bent outward and rearwardly to engage the downwardly extending flange 61 of the rear side bar 54 and is rigidly connected thereto as by means of the bolts 71 which secure one of the wings 66 of the bearing 67.

Suitable means are provided for rigidly connecting the supplemental frame to the main frame. In the form of the construction shown, which is by way of example only, a strap 72 (see Fig. 10) is employed for engaging the intermediate portions of the frame. This strap is rigidly connected to both the upper and lower bars 23 and 19 and has its lower end twisted and rigidly connected to the front side bar 53 of the supplemental or reel supporting frame 6.

A tension member 73 has its outer ends rigidly attached to the front side member 53 adjacent to the ends thereof and has its central portion bent through an angle of 90 degrees to engage the upper surface of the arch bar 23 to which it is rigidly connected as at 74. This member not only assists in supporting the reel frame, but also assists in preventing the twisting of the truss member 11. The rear portion of the implement is supported on the caster 68 which has its stem or shank swiveled in the bearing 67 in the usual manner. On certain types of ground—especially ground having depressions therein—it is desirable to employ two casters for supporting the rear end of the implement so that when one wheel is in a depression, the other will support the load.

The travel of the implement over rough ground has a tendency to twist and wrench the framework and in order to reinforce the frames, and at the same time provide an additional caster, an attachment, designated generally by the reference character 75 has been provided (see Fig. 1). This attachment comprises a bar 76 which is made in the form of an angle having its forward end detachably connected to the vertical flange of the lower bar 19 of the truss frame member. This bar is preferably arched upwardly to afford clearance for the revolving reel.

Suitable means are provided for attaching the rear end of the bar 76 to the rear frame member 54 (see Fig. 1). As shown, an angle bar 77 is employed for this purpose. The lower end of the angle bar is rigidly connected to the rear frame member 54 and has its upper end rigidly connected to the bar 76. One flange of the angle bar 77 is connected to a supporting bar 78 which extends rearwardly in the plane of the bar 76. The bars 76 and 78 are connected together by a gusset 79. A tension member 81 has its ends connected to the rear side bar 54 adjacent to the ends and extends through an opening in the upper end of the angle bar 77. A suitable turnbuckle 82 may be provided for the tension member 81 for placing the proper tension thereon for stiffening and reinforcing the rear side bar 54. The tension member 81, the bar 54 and the plate 77 constitute a rear truss member for the supplemental frame. Likewise the front frame member 53, the tension member 73 and plates 72 constitute a front truss side frame member for the reel supporting frame. By means of this arrangement, the two frames are materially stiffened or trussed and are more rigidly connected together whereby the implement may be satisfactorily operated on rough ground. A supplemental caster 83 having a bearing 84 for the caster shank is connected to the rear end of the bars 76 and 78. When the implement is used as a tedder, it is not desirable to employ the caster 83 because it will travel over the hay during the tedding operation. Suitable means are provided for readily moving this caster to inoperative position when it is not desired to employ it. Any suitable means may be employed for this purpose. In the form of construction shown, one of the wings 85 of the bearing 84 is provided with a pair of openings—one for receiving the bolt 86 and the other for receiving a dowel pin 87. The other wing 88 is provided with an opening for receiving the dowel 89 and a slot for receiving the bolt 91. When it is desired to move the caster to an inoperative position, the nuts on the bolts 86 and 91 are loosened a sufficient distance to permit the wings 85 and 88 to move outwardly to disengage the dowels 87 and 89, after which the caster may be swung about the bolt 86 as a pivot to a position where the caster rests on the tension member 81.

The attachment comprising the auxiliary caster 83, the bars 78 and 76, plate 77 and tension member 81 is detachably connected to the main and reel frame and the implement may be sold with or without the attachment. With this attachment, however, the combined and supplemental frames are stiffer and more rigidly connected together to operate as a single unit. The unit thus constructed constitutes what may be termed a rigid space framework. The provision of the rigid frame construction is considered an important feature of the invention since it prevents harmonic vibration of the frame while the implement is being drawn across rough ground which sometimes occurs when the frame members are not trussed or rigid and the ground is such that the engagement of the wheels in depressions or with projections synchronize with the natural vibrations of the long untrussed frame member.

With rigid main and supplemental frames, it is desirable that the reel be so constructed and mounted that it will readily yield to compensate for elevations on the surface of the ground when the teeth engage the same, as otherwise the teeth may be seriously damaged when they engage elevations on the surface of the ground.

The reel is mounted on and supported by the frame 6 in a manner that will now be described. The reel comprises a shaft or axle 92, the front end of which is provided with a spider 93 in the arms of which the tooth bars 94 are journalled.

The tooth bars 94 are spirally arranged so that in operation they will sweep the teeth over the surface of the ground in a smooth, continuous manner. The outer ends of the tooth bars are journalled in a triangular member 95 (see Fig. 1) which is rigidly connected to the reel axle 92 by the attaching members 96.

The forward ends of the tooth bars 94 are bent to form cranks 97 (see Figs. 3 and 7) which are pivoted in the arms of a track member 98, as is usual in such constructions. An eccentric member 99 pivotally adjustable about the axle 92 is provided with rollers 101 for engaging the track in the member 98 for varying the angularity of the teeth 102 mounted on the tooth bars 94. Since the details of the mechanism constitute no part of the present invention, it is not thought necessary to further illustrate or describe the same, except to state that the eccentric member 99 is provided with an arm 103 to which a link 104 has one end connected and its other end connected to a lever 105 for adjusting the eccentric member 99.

Suitable means are provided for mounting the reel so that it may have a vertical movement independently of the reel frame. In other words, it is desirable that the reel be yieldingly mounted. In the form of construction shown, which is by way of example only, the bearing at each end of the reel has a free vertical movement. On the rear end of the reel, a bearing 108 is slidably mounted in a yoke or stirrup 109 which is rigidly connected at its upper ends to the end frame member 56, as shown more clearly in Figs. 1 and 7 of the drawings. Guards or stripper bars 106 are provided for stripping the material from the teeth in the usual manner.

Suitable means are provided for elevating the outer end of the reel. As shown, a flexible member 111, which may be a chain or cable is connected at its forward end to a hand lever-112 and extends rearwardly over pulleys 113 and 114 and has its end connected to the bearing 108. By means of this arrangement, the reel may be elevated to the desired height, and, at the same time, will be free to move upwardly from the adjusted position due to the fact that it is suspended by the flexible member 111. The forward end of the reel axle is journalled in a bearing 115 which is slidably mounted in a yoke or bracket 116 which at its upper end is adjustably connected to the end bar 55. The bearing 115 is provided with an arm 117 extending upwardly therefrom which is connected to the lower curved end of an adjusting lever 119 (Fig. 4) by pin and slot connection, as shown at 121, permitting a limited free vertical movement of the bearing 115, in any position of adjustment, that when the teeth strike an obstruction, the reel is free to move upwardly independently of the reel frame for permitting the reel and teeth to pass the obstruction.

The lever 119 cooperates with a toothed quadrant 119ᵃ. A spring 118 connecting the load end of the lever 119 with the quadrant 119ᵃ or other fixed part renders the adjustment of the reel bearing less difficult.

The yoke or bracket 116 is adjustable endwise of the end bar 55 in order to loosen or tighten the chain drive belt 122. This adjustment is accomplished in the following manner. A rod 123 is connected to a plate 124 rigidly mounted on the yoke and has its opposite end extending rearwardly through the vertical flange of the rear side frame and member 54 of the reel frame and is provided with the nuts 125 for adjusting the same. By loosening the nuts 126 which secure the yoke 116 to the front end bar 55 the yoke may be moved by means of the rod 123 outwardly to tension the chain 122, after which the nuts 126 may be tightened, for holding the parts in adjusted position.

The reel is driven from the axle by any suitable mechanism. In the form of construction shown, (see Figs. 1 and 5) a pair of gears 127 and 128 are rotatably mounted on the main axle 1 in spaced relation and a clutch member 129 is slidably splined on the main axle 1 so that when the clutch is in one position, it will engage and drive the gear 127, and when in the other position, it will engage and drive the gear 128. The gears 127 and 128 engage a pinion 131 on opposite sides thereof whereby it will be driven in one direction by the gear 127 and in the opposite direction by the gear 128. The pinion 131 is integral with a sprocket 132 which is engaged by a drive chain 122 for driving a sprocket 134 keyed to the reel axle or shaft 92 for operating the reel. In the raking operation, the clutch engages the gear 127 and when the implement is used as a tedder, the clutch is in engagement with the gear 128.

The clutch 129 is provided with the usual clutch yoke 135 which is adapted to be operated by a suitable lever 136 through a connecting link 137 (see Figs. 1, 2 and 5). Suitable means are provided for supporting the driving mechanism for the reel. In the form of the construction shown, a gear supporting bar or plate 37 is employed for this purpose (see Figs. 2 to 6, inclusive). This bar or plate is roughly in the form of a C, having one end attached to the bearing 33, as clearly shown in Fig. 6 of the drawings and having its intermediate portion bent diagonally rearward, and then curved forwardly with the end bent upward and secured to the draft yoke 14. The sprocket 132 is rotatably mounted on a stub axle 141 which is rigidly connected to a bracket 142 which is clamped between the front end bar 55 of the supplemental frame and the gear supporting plate 37, as shown in Figs. 4 and 5 of the drawings. It will thus be seen that by the use of a gear supporting bar or plate 37 the gear mechanism may be readily assembled and the parts rigidly held in operative position with an inexpensive construction that may be readily detached when desired.

It is thought from the foregoing taken in connection with the accompanying drawings that the construction and operation of our device will be apparent to those skilled in the art and that changes in size, shape, proportion and details of construction may be made without departing from the spirit and scope of the appended claims.

We claim:

1. In a side delivery rake, a wheeled axle, a main frame secured to said axle and comprising a pair of side members extending forwardly and rearwardly from said axle, one of said side members comprising a bar and the other a trussed beam, said beam comprising upper and lower bars spaced vertically, a plurality of spacer members extending between said bars, a supplemental frame secured at one end to said first-named bar and extending diagonally rearward beneath said beam, said supplemental frame comprising a front frame member and a rear frame member, a supporting bar extending over said trussed beam and having its intermediate portion connected to an intermediate portion of said trussed beam and having its ends secured to said front frame member adjacent the ends thereof, a caster bearing, a bearing provided with an attaching member, means for rigidly connecting said beam, rear end and frame members and said attaching member together, a supporting beam having its front end rigidly connected to an intermediate portion of the trussed beam and extending rearwardly therefrom, a rigid standard fixed to and extending upwardly from said rear frame member and rigidly connected to said supporting beam, a supplemental caster, and means for movably connecting the same to the rear end of said supporting beam.

2. A caster attachment for a side delivery rake comprising a bar, a vertical angle plate rigidly secured to and extending downwardly from said bar, a supporting bar rigidly connected to the lower end of said plate and to the rear end of said first-named bar, and a caster secured to the rear ends of said bars.

3. In a farm implement, a main frame, a reel supporting frame rigidly secured thereto, said main frame comprising upper and lower angle bars spaced vertically, truss elements connected to said bars, gusset plates for connecting the ends of said bars together, said lower bar having its rear end extending substantially horizontally, said reel supporting frame having a rear side bar of angle iron provided with vertical and horizontal flanges, said side bar having its rear end bent rearwardly in vertical alignment with the rear end of said lower angle bar and having its horizontal flange engaging the horizontal flange of said lower angle bar and rigidly secured thereto, and a caster wheel bearing rigidly secured to the vertical flanges of said rear side bar and lower angle bar.

4. In a farm implement, a wheeled axle, a main frame having a side bar having its forward end bent laterally and then rearwardly to form a draft yoke, said bar having a laterally extending flange and a downwardly extending flange, a trussed side bar comprising an upper and a lower arched angle bar, means for rigidly securing said last-named bars together, the ends of said lower angle bar extending outwardly beneath the ends of said upper arched bar in a substantially horizontal plane, said lower angle bar having upwardly and laterally extending flanges, the laterally extending flange at the forward end of said bar resting on and rigidly secured to the laterally extending flange of the rearwardly turned end of said first-named bar, a reel supporting frame comprising front and rear end and side bars, the rear side bar being an angle bar with laterally and downwardly extending flanges and having its outer end extending rearwardly beneath the rear end of said lower arched bar, means for securing the horizontal flanges of said last-named bars together, and a caster bearing rigidly secured to the downwardly extending flanges of said bars.

5. In a side delivery rake, a wheeled axle, a main frame secured to said axle, said main frame including a trussed beam extending rearwardly from said axle and comprising upper and lower bars arched upwardly and vertically spaced, means for rigidly connecting the ends of said bars together, a reel supporting frame, means for rigidly securing said reel supporting frame to an intermediate portion of said trussed beam for supporting said reel supporting frame from said main frame, a reel rotatably mounted on said reel supporting frame, means for vertically adjusting said reel on said reel supporting frame, a supporting member rigidly connected to said trussed beam and extending rearwardly, a caster, and means for connecting said caster to said supporting member.

6. In a side delivery rake, a wheeled axle, a reinforced arched beam placed rearwardly and diagonally to the axle, the forward end of which is rigidly connected to and supported by the axle, a caster wheel supporting the rear end of said beam, a reel supporting frame extending diagonally to the axle and below the reinforced beam, means for rigidly connecting said frame to said axle, means for rigidly connecting said frame to said beam, bearing supports on said frame, bearings vertically slidable in said supports, and flexible, inextensible members for adjusting said bearings vertically in said supports whereby said bearings are positively held from moving downward beyond the adjusted position but are free to move upward therefrom.

7. In a combined rake and tedder, an axle, a main frame comprising a rearwardly extending trussed frame member rigidly secured to said axle, said trussed frame member comprising a pair of upwardly arched bars spaced vertically, means for rigidly connecting the ends of said members together, a supplemental frame supported thereby, said supplemental frame comprising trussed front and rear bars, means for rigidly connecting said trussed bars to said trussed frame member, a toothed reel rotatably supported in said supplemental frame, means for rotating said reel, and means including a caster for supporting the rear end of said main frame.

8. In a farm implement, a main frame, an axle for supporting the forward portion of said frame, a caster for supporting the rear portion thereof, said frame including a truss member comprising a pair of rearwardly extending, upwardly arched bars spaced vertically and having brace elements connecting said bars, means for rigidly connecting the ends of said bars together, means for rigidly connecting said truss member to said axle at its forward end, means for rigidly connecting said truss member to said caster at its rear end, a supplemental frame rigidly connected to said truss member and to another portion of said main frame opposite said truss member, and a reel adjustably mounted on said supplemental frame.

9. In a farm implement, a main frame and a supporting beam, a reel supporting frame, means connected to said beam for supporting said reel supporting frame, a reel, vertical reel guiding means on said reel supporting frame, and means connecting said reel and said reel supporting frame for adjusting the same in said guiding means, said adjusting means comprising a flexible and inextensible member, said member positively limiting the downward movement of said reel but permitting said reel to move freely upwardly in any adjusted position of the reel.

10. In a farm implement, a main frame and a supporting beam, a reel supporting frame, means connected to said beam for supporting said reel supporting frame, a reel, vertical reel guiding means on said reel supporting frame, bearings for the reel slidably mounted in said guiding means, and a chain connecting said bearings and supporting frame for adjusting the reel in said guiding means, said chain positively limiting the downward movement of said reel but permitting said reel to move freely upwardly in any adjusted position of the reel.

11. In a farm implement, a main frame, a supporting beam having one end connected to said main frame, a reel supporting frame carried by said beam, a reel, vertical reel guiding means on said reel supporting frame, means connecting the reel and reel supporting frame for adjusting the same in the guiding means, said adjusting means comprising a flexible and inextensible member, said member positively limiting the downward movement of the reel but permitting the reel to move freely upwardly in any desired position of the reel, a caster carried by the other end of the supporting beam, a supplemental caster, and means mounting the supplemental caster on the reel supporting frame, said means being movable to move the supplemental caster to inoperative position.

12. In a side delivery rake, a beam, a wheeled axle mounting the forward end of the beam, a caster wheel mounting the rear end of the beam, a rotatable raking reel including a shaft, means including the beam for supporting the reel, and means for vertically adjusting the reel in said supporting means, said adjusting means comprising bearings for the shaft, inextensible means hanging said bearings and movable to raise and lower the bearings through a range of adjusted positions in which the reel is positively held from moving below a predetermined zone of operation but is free to move upwardly from said zone.

13. In a farm implement, a main frame and a supporting beam, a reel supporting frame, means connected to said beam for supporting said reel supporting frame, a reel, vertical reel guiding means on said reel supporting frame, means connecting said reel and said reel supporting frame for adjusting the same in said guiding means, said adjusting means comprising a flexible and inextensible member, said member positively limiting the downward movement of said reel but permitting said reel to move freely upwardly in any adjusted position of the reel, and means at the front of said implement for operating said inextensible means for vertically adjusting said reel on said reel supporting frame.

14. In a side delivery rake, a beam, a wheeled axle mounting the forward end of the beam, a caster wheel mounting the rear end of the beam, a rotatable raking reel including a shaft, means including the beam for supporting the reel, means for vertically adjusting the reel in said supporting means, said adjusting means comprising a member mounting the reel and movable to provide an adjustable stop below which the reel is positively prevented from moving and above which the reel is free to move, and means for setting said adjustable means in any of a plurality of adjusted positions.

15. In a farm implement, a wheeled axle, a frame mounted thereon and having a rearwardly extending portion, a rigid truss member comprising two light upwardly curved bars spaced vertically, a plurality of brace elements extending between said bars and rigidly connected thereto to stiffen the truss member, means rigidly connecting the forward end of said truss member to said frame, a caster comprising a wheel and an axle therefor, a shaft mounting said axle and extending upwardly therefrom, a bearing for said shaft, means rigidly connecting said bearing to the rear end of said truss member, a supplemental frame, a reel rotatably mounted in said supplemental frame, and means connecting the supplemental frame to the beam comprising a diagonal brace element secured to said frame and beam and forming therewith a rigid truss.

16. A caster attachment for a side delivery rake comprising a bar, a vertical angle plate rigidly secured to and extending downwardly from said bar, a supporting bar rigidly connected to the lower end of said plate and to the rear end of said first-named bar, a caster, means for hingedly connecting said caster to the rear ends of said bars whereby said caster may be turned to an inoperative position, and means for securing said caster in lowered position.

THEODORE H. OPPENHEIM.
HENRY SYNCK.